United States Patent
Lee

(10) Patent No.: US 9,367,618 B2
(45) Date of Patent: Jun. 14, 2016

(54) CONTEXT BASED SEARCH ARRANGEMENT FOR MOBILE DEVICES

(75) Inventor: Younghyun Lee, Seongnam-si (KR)

(73) Assignee: Yahoo! Inc., Sunnyvale, CA (US)

( * ) Notice: Subject to any disclaimer, the term of this patent is extended or adjusted under 35 U.S.C. 154(b) by 1393 days.

(21) Appl. No.: 12/188,178

(22) Filed: Aug. 7, 2008

(65) Prior Publication Data

US 2010/0036830 A1    Feb. 11, 2010

(51) Int. Cl.
| G06F 7/00 | (2006.01) |
| G06F 17/00 | (2006.01) |
| G06F 17/30 | (2006.01) |

(52) U.S. Cl.
CPC .... *G06F 17/30864* (2013.01); *G06F 17/30967* (2013.01)

(58) Field of Classification Search
CPC .......... G06F 17/30595; G06F 17/3064; G06F 17/30867; G06F 17/30554; G06F 17/30864; G06F 17/30722
USPC ............ 707/10, 3, 5, 706, 737; 715/234, 745; 705/14; 709/203, 224
See application file for complete search history.

(56) References Cited

U.S. PATENT DOCUMENTS

| 6,574,553 | B1 * | 6/2003 | Beesley et al. ................. 701/209 |
| 6,785,671 | B1 | 8/2004 | Bailey et al. |
| 6,963,867 | B2 | 11/2005 | Ford et al. |
| 7,146,416 | B1 * | 12/2006 | Yoo et al. ...................... 709/224 |
| 7,219,123 | B1 * | 5/2007 | Fiechter ............ H04M 1/72561 704/E15.045 |
| 7,330,829 | B1 * | 2/2008 | Tenorio ...................... 705/26.62 |
| 7,395,259 | B2 | 7/2008 | Bailey et al. |
| 7,430,561 | B2 | 9/2008 | Bailey et al. |
| 8,676,830 | B2 * | 3/2014 | Mukherjee ........ G06F 17/30864 707/768 |
| 2002/0103789 | A1 * | 8/2002 | Turnbull et al. ................... 707/3 |
| 2003/0105719 | A1 * | 6/2003 | Berger et al. ................... 705/51 |

(Continued)

FOREIGN PATENT DOCUMENTS

| EP | 1489527 A1 | 12/2004 |
| KR | 100706490 B1 | 4/2007 |
| WO | 2007045671 A1 | 4/2007 |

OTHER PUBLICATIONS

Google Mobile—Search, Google Search for your phone, http://www.google.com/mobile/default/search/#utm_campaign=en& . . . , accessed Aug. 7, 2008, 2 pages.

(Continued)

*Primary Examiner* — Susan Chen
(74) *Attorney, Agent, or Firm* — James J. DeCarlo; Greenberg Traurig, LLP

(57) ABSTRACT

Embodiments are directed towards managing mobile searches by enabling a user to indicate a context of a search query to narrow a scope of the search. A user may fine tune a search by selecting from a plurality of pre-defined contexts for which to perform a search query. In one embodiment, the user may combine two or more pre-defined contexts to create more complex contexts for use in customized context search queries. The user also enters one or more search terms. A subset of databases is selected from a plurality of databases associated with different subject categories. The subset of databases is selected as predefined by an operator based on the user's context, and searched based on the user's entered search terms and selected context. Results are then aggregated and provided to the user. Results may be rank ordered based on the given user context or user's previous search behavior.

19 Claims, 9 Drawing Sheets

(56) References Cited

U.S. PATENT DOCUMENTS

| | | | |
|---|---|---|---|
| 2003/0135582 A1* | 7/2003 | Allen et al. | 709/217 |
| 2003/0195877 A1 | 10/2003 | Ford et al. | |
| 2004/0002962 A1* | 1/2004 | Banerjee et al. | 707/3 |
| 2005/0004889 A1 | 1/2005 | Bailey et al. | |
| 2005/0021553 A1 | 1/2005 | Romijn et al. | |
| 2005/0071328 A1* | 3/2005 | Lawrence | G06F 17/3053 |
| 2005/0223030 A1* | 10/2005 | Morris et al. | 707/104.1 |
| 2005/0289140 A1 | 12/2005 | Ford et al. | |
| 2006/0143083 A1* | 6/2006 | Wedeen | 705/14 |
| 2006/0167864 A1 | 7/2006 | Bailey et al. | |
| 2006/0218245 A1* | 9/2006 | Horn | 709/218 |
| 2006/0253438 A1* | 11/2006 | Ren | G06F 17/30616 |
| 2007/0027852 A1* | 2/2007 | Howard | G06F 3/0237 |
| 2007/0233692 A1* | 10/2007 | Lisa et al. | 707/10 |
| 2008/0104116 A1* | 5/2008 | Van Hoe et al. | 707/104.1 |
| 2009/0012826 A1* | 1/2009 | Eilam et al. | 705/7 |
| 2010/0058168 A1* | 3/2010 | Gibb et al. | 715/234 |
| 2011/0041076 A1* | 2/2011 | Sinn et al. | 715/745 |

OTHER PUBLICATIONS

Google—Web Search Help Center, Advanced Search Made Easy, http://www.google.com/support/bin/static.py?page=searchguides. ht . . . , accessed Aug. 7, 2008, 3 pages.

Yahoo! Advanced Web Search, http://search.yahoo.com/web/advanced?ei=UTF-8, accessed Aug. 7, 2008, 2 pages.

\* cited by examiner

CONTEXT BASED SEARCH ARRANGEMENT FOR MOBILE DEVICES

TECHNICAL FIELD

The present invention relates generally to managing searches over a network and, more particularly, but not exclusively to providing a context based search capability for at least mobile devices.

BACKGROUND

Tremendous changes have been occurring in the Internet that influence our everyday lives. For example, in today's society, mobile computing devices are becoming increasingly more common. Many mobile computing devices, such as personal digital assistants, cellular phones, and the like, may be employed to communicate voice messages, emails, text messages, and so forth, as well as to search for information over the Internet. It is not uncommon to see a person on a bus, train, or even a boat, to be using their mobile devices to search for merchants, restaurants, music, businesses, or the like.

However, performing a search query for user relevant information still remains cumbrous. Often, the user might have to perform several search queries to obtain relevant search results. Multiple searches may be even more cumbersome when the search is performed using a mobile device that may include small screens, small keyboards, and/or other input mechanisms as opposed to traditional desktop screens, keyboards, and/or other desktop input mechanisms. Irrelevant search results mean that the user is less likely to find what they are looking for, which in turn may translate into lost opportunities for merchants, or other businesses, to prosper from the user. Where the searches involve social networking activities, such as searches for family, friends, jobs, images from friends or family, online dating activities, or the like, the frustration might further result in lost meeting opportunities, lost job opportunities, lost friendships, or the like.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
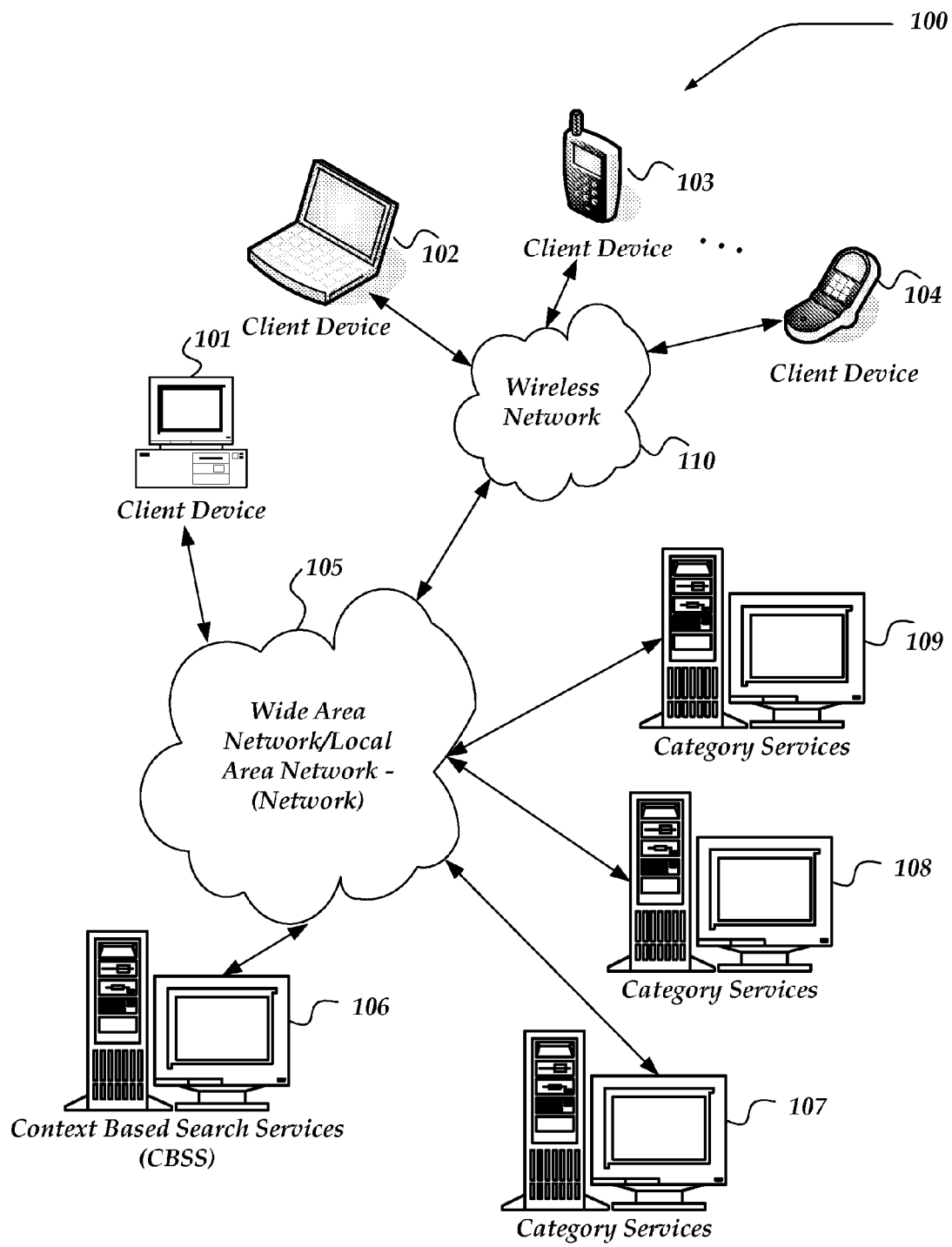
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards enabling a user to manage searches by enabling a search user to indicate a context, or intent, of a search query. In particular, because mobile devices often have limited screen display sizes, and/or restricted network bandwidth, a user may fine tune a search to attempt to overcome such limitations by selecting from a plurality of pre-defined contexts for which to perform a search query. By narrowing the search to pre-defined contexts, processing bandwidth may also be managed. In one embodiment, the user may combine two or more pre-defined contexts to create more complex contexts for use in customized context search queries.

The user may further enter one or more search terms, in addition to selecting a context. A subset of databases is selected from a plurality of databases that are each associated with a different defined subject category. In one embodiment, the plurality of different subject categories include but are not limited to finance, shopping, news, web, blogs, user answers, community, or the like. The subset of databases is selected from the set that is predefined by operators based on the user's context for the search. The subset of databases is then searched based on the user's entered search terms and selected context. Results are then aggregated and provided to the user. In one embodiment, the results are rank ordered based on the given user context or the user's previous search behavior.

Thus, by employing the user's selected context, searches may be focused to minimize search time, and an amount of search results that may span contexts for which the user may not be interested. Thus, the present invention is directed toward employing a user's selected context to provide the user's intent for a search. The user's context provides an intent that may then be employed to generate a rule set which may map a user's context and other relevant properties for use in performing a search. A result of the search may then provide more space which is more likely to have items relevant to the user by ruling out results from various database sources which are less likely to have relevant items satisfying the intent of the user's search.

Moreover, using the user's context for mobile device searches is further directed towards minimizing processing bandwidth and screen real estate required for providing search results to the user.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, Context Based Search Services (CBSS) 106, and category services 107-109.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WML-Script, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may Per be configured to include a client application that enables the user to log into a user account that may be managed by another computing device, such as CBSS 106, or the like. Such user account, for example, may be configured to enable the user to receive emails, send/receive IM messages, SMS messages, access selected web pages, or participate in any of a variety of other social networking activity. However, managing of messages or otherwise participating in other social activities may also be performed without logging into the user account.

A user of client devices 101-104 may employ any of a variety of client applications to access content, read web pages, receive/send messages, or the like. In one embodiment, each of client devices 101-104 may include an application, or be associated with an application that resides on the client device or another network device, that is useable to perform and/or otherwise manage contextual based searches. Such contextual based searching enables a user of one of client devices 101-104 to select from a pre-defined plurality of contexts from which to perform a search. The user may select from such contexts including, but not limited to news, fun, location, shopping, images, consumables, eating, education, or the like. In one embodiment, the user may select to perform a search over all of the plurality of contexts by selecting a default context of all. In one embodiment, the user may also employ an interface to the application to combine two or more pre-defined contexts to create a 'new' context. The user may also provide one or more terms for use in the contextual search query. Submitting the terms and the context enables the user to narrow the focus of the searches, returning information that is more likely to be directed towards an intent or context of the user's search query.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (OSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple CBSS 106, category services 107-109, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (JSB) port, other forms of computer-readable media, or any combination thereof On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Category services 107-109 represent a plurality of network devices that may provide access to a variety of different content and/or services. In one embodiment, category services 107-109 might represent websites that provide different educational services, financial services, blogs, location services, music services, online dating services, maps, images, job services, games, or the like. Category services 107-109 may also include sites that enable users to provide Answers to various questions that may be posed by other users. Thus, in at least one embodiment, at least some of the category services include online social networking services. However, the category of services available through category services 107-109 may also include merchant sites, health sites, and/or virtually any other type or category of information for which a user might seek over a network.

In one embodiment, category services 107-109 may each include a database, data store, or the like, that may be searched to identify information for a given category managed by category services 107-109. However, the invention is not limited to this configuration. For example, in another embodiment, CBSS 106 might include a capability to perform searches, such as using a web crawler, spider, robots, or the like, to search category services 107-109 and generate a plurality of databases based on results of the searches. In one embodiment, each of the databases in the plurality of databases may be configured to be specific to a defined category. Thus, in one embodiment, one database might include information for finances, for example, based on crawling category services 107-109. However, the invention may also include other arrangements of data stores, instead of databases of defined categories.

CBSS 106 includes virtually any network device that may be configured to provide a user interface useable for contextual based searches on a client device, such as client devices 101-104. In one embodiment, CBSS 106, as noted above, may include a plurality of databases, each database (or data store) being configured with searchable information about a defined category. In another embodiment, CBSS 106 is configured to access such databases (or data stores) from another network device, such as category services 107-109.

CBSS 106 may determine based on an analysis of searches performed by a plurality of users over time, a plurality of contexts for use in enabling users to narrow a scope of a search query. In one embodiment, the plurality of pre-defined contexts may include, but are not limited to news, fin, location, shopping, image, eating, education, and consumables. Other contexts may also be pre-defined based on additional, and/or subsequent analysis of search patterns of users. In one embodiment, the plurality of contexts might be modified based on subsequent analysis. It is noted that the selection of the plurality of pre-defined contexts may also be determined based on a variety of other criteria in addition to, or in place of a historical analysis. For example, in one embodiment, the pre-defined contexts might be selected based on a user survey, or the like.

In any event, CBSS 106 may provide to a user an interface that enables the user to select one or more contexts for use in searching. The interface may also enable the user to provide one or more search terms that comprise a search query. CBSS 106 may employ a context selected by the user to select a subset of the plurality of databases over which to conduct a search. CBSS 106 may perform the narrowed search using the user entered search term(s) and context to generate search results. In one embodiment, separate searches might be conducted over each database in the subset of databases. However, in another embodiment, a single search might be conducted over the subset of databases.

CBSS 106 may then aggregate or otherwise combine results from the search(es), to generate results that may be combined in a rank ordering, context grouping, or the like. CBSS 106 may then provide the results over a network to a requesting client device for display. In one embodiment, CBSS 106 might employ a process such as that described in more detail below in conjunction with FIG. 4 to perform at least some of its actions.

Devices that may operate as CBSS 106, and/or category services 107-109 include, but are not limited to personal computers, desktop computers, multiprocessor systems, microprocessor-based or programmable consumer electronics, network PCs, servers, network appliances, and the like.

Although CBSS 106 is illustrated as a distinct network device, the invention is not so limited. For example, a plurality of network devices may be configured to perform the operational aspects of CBSS 106. For example, in one embodiment, the providing user interfaces might be performed within one or more network devices, while the category database analysis, creation, management, searches, and/or the like, may be performed within one or more other network devices. However, other combinations are also possible, Thus, the invention is not to be construed as being narrowed by the arrangement illustrated in FIG. 1, and others are also within the scope of the invention.

Illustrative Client Environment

Figure 2:
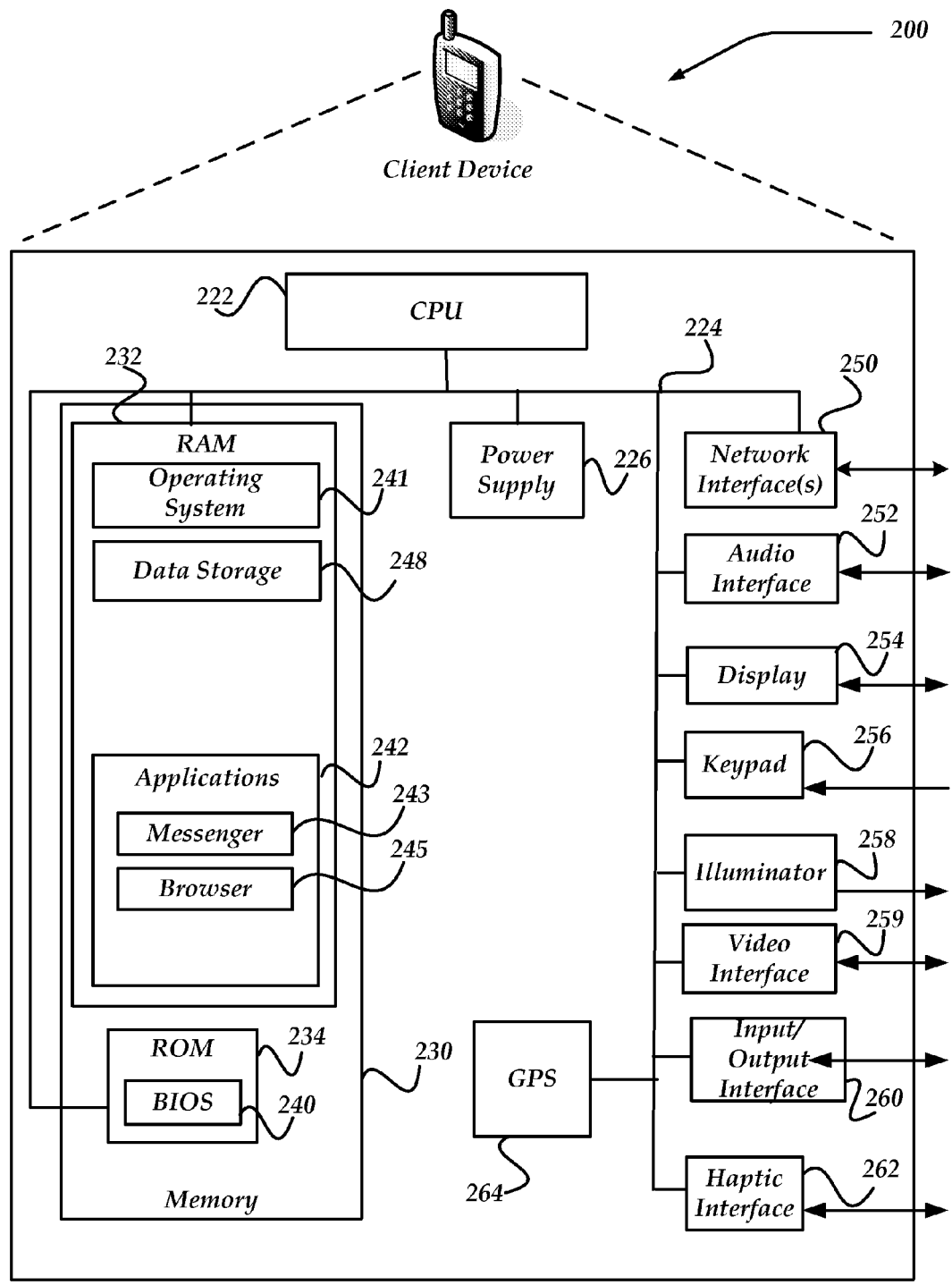
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, r any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Inage sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200, as well as store an identifier. The information, including the identifier, may then be provided to another device based on any of a variety of events, including being sent as part of a header during a communication, sent upon request, or the like. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 248 may also be employed to store personal information including but not limited to contact lists, personal preferences, data files, graphs, videos, or the like. Data storage 248 may further provide storage for user account information useable with one or more message addresses, message folders, or the like. Thus, data storage 248 may include various message storage capabilities to store and/or otherwise manage message folders, such as email folders for spam messages, ham messages, bulk messages, inbox messages, deleted messages, or the like. In one embodiment, data storage 248 may also store and/or otherwise manage user search preferences, search results, and/or the like. At least a portion of the information may also be stored on a disk drive or other storage medium (not shown) within client device 200.

Applications 242 may include computer executable instructions which, when executed by client device 200, transmit receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243, and browser 245. It is noted however, that in one embodiment, applications 242 might also include a downloadable component useable in performing at least in part contextual based searches.

Browser 245 may include virtually any client application configured to receive and display graphics, text, multimedia, and the like, employing virtually any web based language. In one embodiment, the browser application is enabled to employ Handheld Device Markup Language (HIDML), Wireless Markup Language (WML), WMLScript, JavaScript, Standard Generalized Markup Language (SMGL), HyperText Markup Language (HTML), extensible Markup Language Q(ML), and the like, to display and send a message. However, any of a variety of other web based languages may also be employed.

In one embodiment, a user of client device 200 might employ browser 245 to access a network device for display of user interfaces useable to manage contextual based searches. Thus, in one embodiment, browser 245 might display a variety of input interfaces and/or results interfaces for contextual searches, such as, but not limited to the non-exhaustive examples of interfaces described in more detail below in conjunction with FIGS. 5-9.

However, the invention is not constrained to employing browser 245 to enable client device 200 to manage contextual based searches. For example, in another embodiment, a downloadable component, including, but not limited to, a script, an applet, a program, or the like, that may be employed to manage contextual based searches. In still another embodiment, an application might be installed through any of a variety of other mechanisms onto client device 200 for use in managing contextual based searches, without departing from the scope of the invention.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols.

Illustrative Network Device Environment

Figure 3:
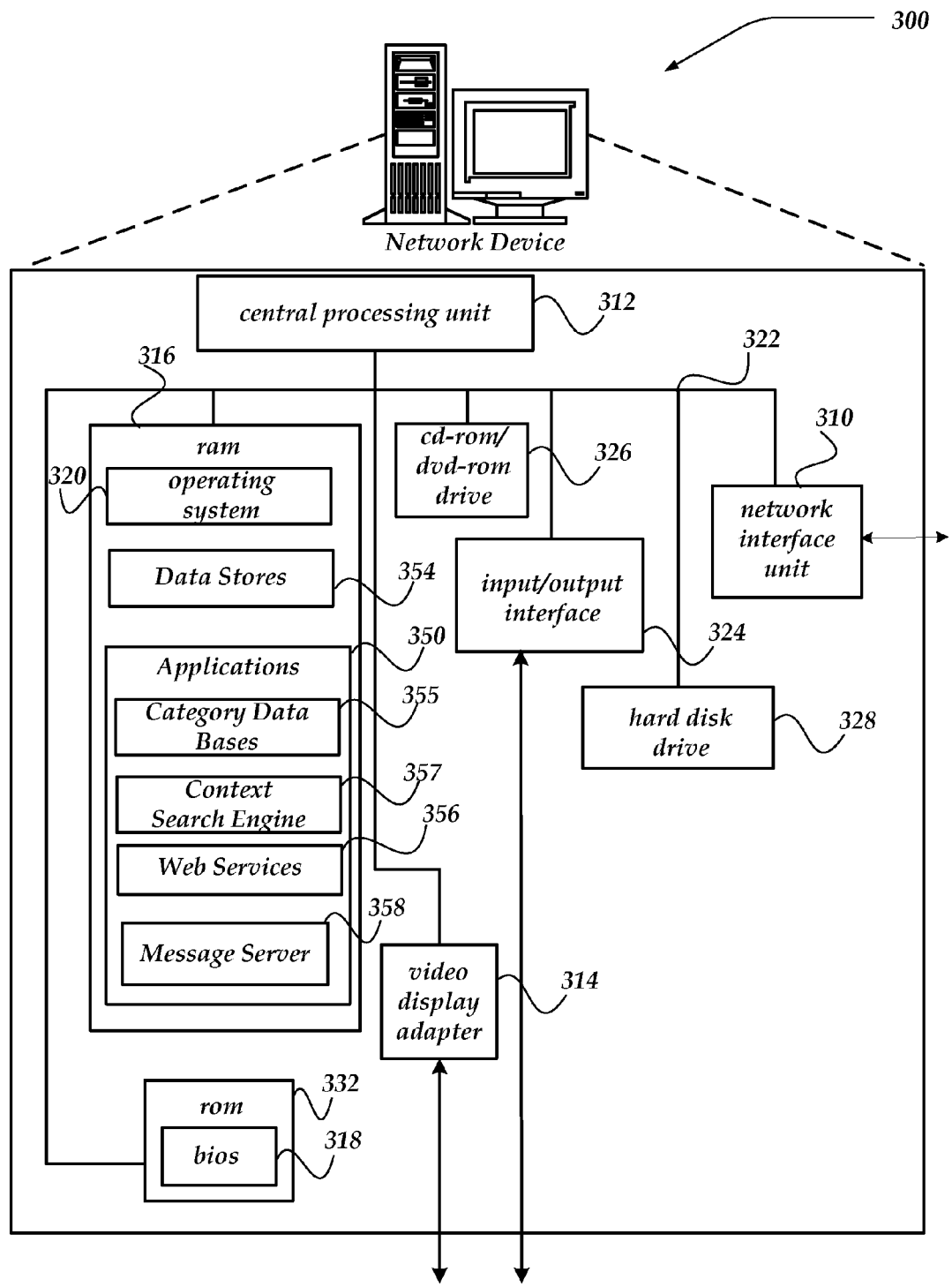
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, CBSS 106 of FIG. 1.

Network device 300 includes central processing unit (CPU) 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example, mass memory might include data store 354+Data store 354 may be include virtually any mechanism usable for store and managing data, including but not limited to a file, a folder, a document, or an application, such as a database, spreadsheet, or the like. Data store 354 may manage information that might include, but is not limited to web pages, user interface pages, pre-defined contexts, links to a plurality of data stores useable for storing and/or managing searchable category data, and the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include web services 356, Message Server (MS) 358, category databases 355, and context search engine 357.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

Message server 358 may include virtually any computing component or components configured and arranged to forward messages from message user agents, and/or other message servers, or to deliver messages to a local message store, such as data store 354, or the like. Thus, message server 358 may include a message transfer manager to communicate a message employing any of a variety of email protocols, including, but not limited to Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types.

Category databases 355 may include virtually any mechanism for storing and managing a plurality of category databases. Such category databases may be provided by another application, such as web services 356, or even through an application residing on another network device. For example, category databases 355 might be stored and/or otherwise managed by respective category services, such as category services 107-109 of FIG. 1. In that embodiment, category databases 355 might be stored on and accessed from another network device than network device 300.

In one embodiment, each database in category databases 355 may be associated with a defined category, where such categories, include, but are not limited to finance, educational, blogs, location, Answers, music, maps, images, online dating, merchant sites, or the like. In fact, virtually any topic grouping of information available over the internet may be employed as a category. Thus, in one embodiment, at least some of the categories might be classified as social networking categories.

Data about the categories might be obtained by crawling various websites to identify potential material. In one embodiment, the crawling may be performed by a robot, spider, or the like, through context search engine 357, web services 357, and/or another application. Information within category databases 355 might include but is not limited to summaries of content and/or services managed and/or hosted through a category service, Uniform Resource Identifier (URI), or another link mechanism to corresponding web pages, content, or the like.

Context Search Engine 357 represents virtually any application that may be configured to provide user interfaces to a client device and enable contextual based searches. Possible, non-exhaustive, non-limiting examples of embodiments of user interfaces that context search engine 357 might provide are described in more detail below in conjunction with FIGS. 5-9. In one embodiment, context search engine 357 may provide the interfaces to web services 356 for display at a client device, and for receiving user inputs.

Context search engine 357 may provide, for example, an interface that enables a user to select from a plurality of pre-defined contexts for which a search is to be performed. Such pre-defined contexts include, but are not limited to for news, for fun, for location, for shopping, for image, for eating, for education, for consumables, or the like. In one embodiment, context search engine 457 may allow a user to select more than one pre-defined context. For example, the user might be enabled to select a context of all pre-defined contexts. In one embodiment, a total or all pre-defined contexts might be a default selection. Context search engine 357 might further enable the user to create a new context based on a combination of two or more pre-defined contexts.

Context search engine 357 may then, based on the selected context, (the context selections being predefined for the user, in one embodiment), and independent of a further action by the user, select a subset of category databases from category databases 355 from which to conduct a search. By selecting a subset based on context, the invention enables a focused search to be performed, thereby potentially saving search time, and/or processing bandwidth.

Context search engine 357 further provides an input interface for the user to provide a search query comprising one or more search terms. Context search engine 357 may then perform a search using the search query and context over each category database in the subset of category databases. In one embodiment, context search engine 357 may also provide the context and search query to another search engine operating remote to network device 300, to request a search be performed. Thus, in one embodiment, context search engine 357 might send the context and search query to each category service associated with the subset of category databases to have the respective category services perform a search.

Context search engine 357 may receive the results and process them using a variety of mechanisms. For example, in one embodiment, the results may be aggregated into a list of responses based on various criteria, including, but not limited to how content within a response may be (e.g., how recently it was updated), a weighting based on a preferred source of the content, or the like. Context search engine 357 may also order the results based on contexts. For example, where the user input a plurality of contexts (e.g., a new combination of contexts, a total of all contexts, or the like), context search engine 357 might order the results based on contexts. In still another embodiment, context search engine 357 might employ historical information about previous searches conducted by the user, user preferences, or other information about the user to rank order the results. In one embodiment, context search engine 357 might further truncate the results based on a network characteristic, a client device characteristic, or the like. By truncating the results, bandwidth to the client device, and/or real estate of the client device may be managed. In any event, context search engine 357 might employ a process, such as described in more detail below in conjunction with FIG. 4 to perform at least some of its actions.

Generalized Operation

Figure 4:
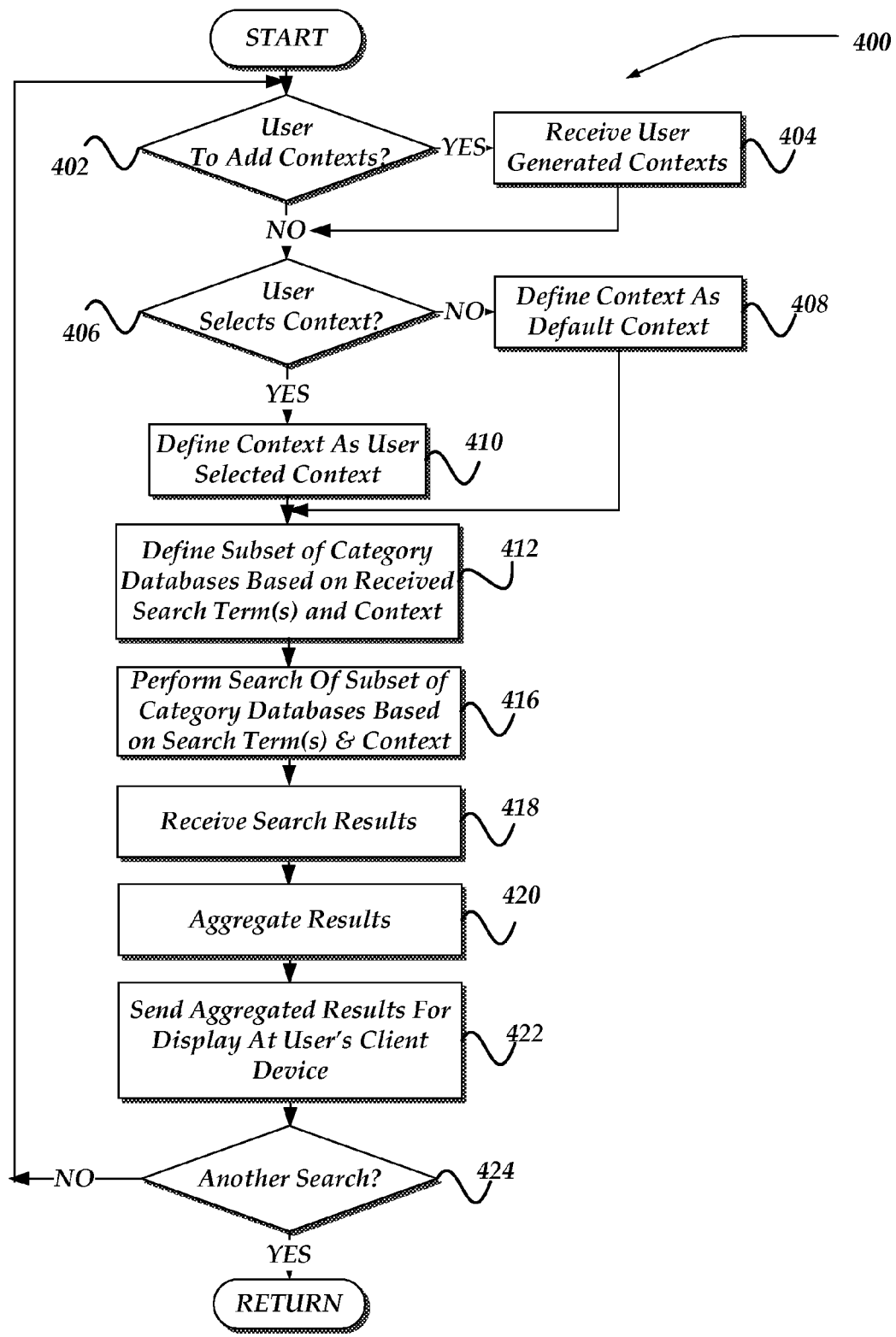
FIG. 4 illustrates a logical flow diagram generally showing one embodiment of a process for managing contextual based searches useable on a mobile device.

The operation of certain aspects of the invention will now be described with respect to FIG. 4 FIG. 4 illustrates a logical flow diagram generally showing one embodiment of a process for managing contextual based searches useable on a mobile device. Process 400 may be implemented, for example, in one embodiment, within CBSS 106 of FIG. 1.

Figure 8:
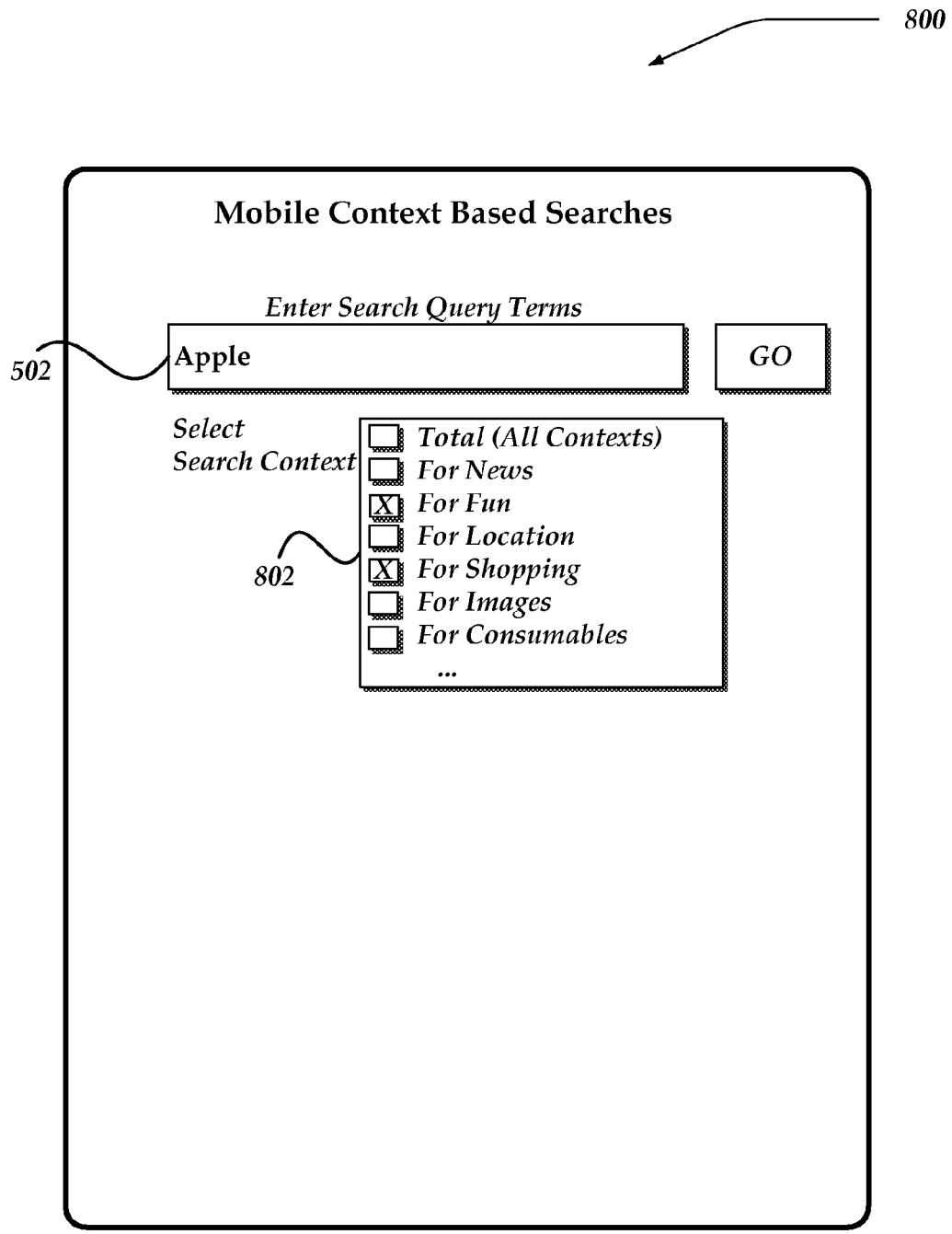

Process 400 begins, after a start block, at decision block 402, where a determination is made whether a new context is to be added for the user. One possible user interface useable to enable a user to generate new contexts is shown in FIG. 8. In one embodiment, the user might be enabled to combine two or more pre-defined contexts to generate a new context. In this manner, a user may further narrow and customize a search context. In any event, if a new context is to be added, processing flows to block 404 where the new context is generated for display and use by the user. Processing then flows to decision block 406. If, however, a new context is not to be added, processing flows to decision block 406.

At decision block 406, a determination is made whether the user has selected a context from the pre-defined contexts (including a possible new context). If so, processing flows to block 408, where a default context for a search may be selected. In one embodiment, the default may be selected based on previous user searches, user preferences, or the like. In one embodiment, the default might be the total of all of the pre-defined contexts. Processing then flows to decision block 412, If the user has selected a context, processing flows to decision block 410, where the defined context is the user selected context(s). Processing then continues to block 412.

At block 412, in one embodiment, CBSS 106, or the like, obtains the chosen context and search query from the user request and defines the subset of category databases over which the searches are to be performed. Processing flows next to block 416.

At block 416, the subset of category databases (data stores) is searched using the received search query and the context(s). That is, in one embodiment, a plurality of searches may be performed where each search is performed within one of the selected subset of databases.

Processing continues next to block 418, where results from the one or more searches are received. Continuing to block 420, the results may be combined, ordered, aggregated, or the like, based on a variety of criteria, including those described above. Process 400 next flows to block 422, where the results may be sent to the user's client device for display. In one embodiment, the results may be truncated based on a characteristic of the client device, split into multiple scrollable pages, or the like. The results may then be sent over a network to the client device.

Process 400 flows next to decision block 424, where a determination is made whether to conduct another search. If the user is to conduct another search, processing may loop back to decision block 402; otherwise, processing may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative User Interfaces

FIGS. 5-9 illustrate various non-limiting, non-exhaustive embodiments of user interfaces useable for inputting and/or displaying results for contextual based searches useable on a mobile device. Each of the illustrated interfaces may include many more or less components than those shown. The components shown, however, are sufficient to disclose an illustrative embodiment for practicing the invention.

Figure 5:
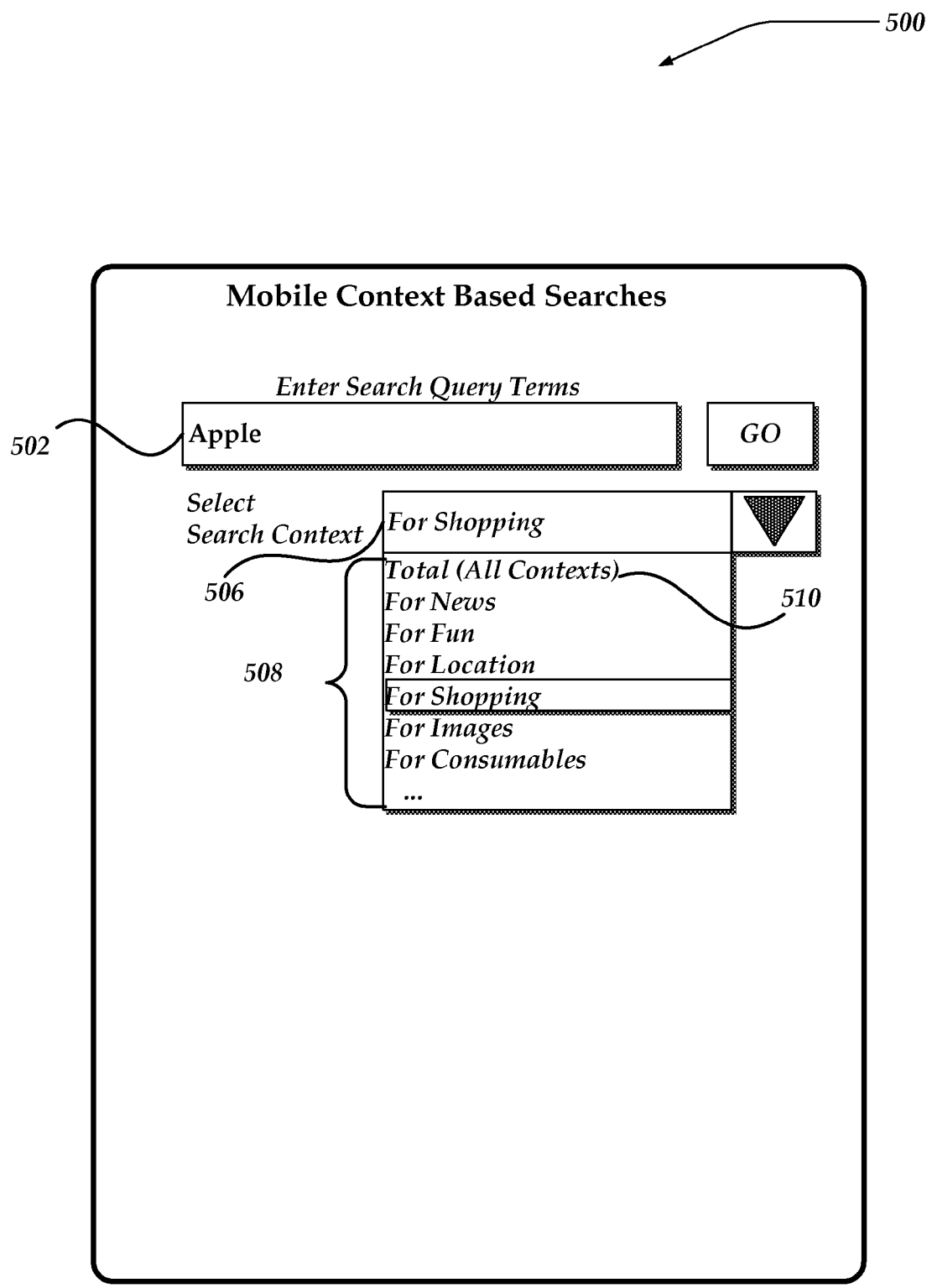
FIGS. 5-9 illustrate various embodiments of user interfaces useable for inputting and/or displaying results for contextual based searches useable on a mobile device.

FIG. 5 illustrates one embodiment of a user interface 500 that may be displayed on a client device to enable contextual based searches. As shown, interface 500 includes a query field 502, and a context selector 506. Query field 502 enables the user to enter one or more query terms for use in performing a search. Context selector 506 illustrates one possible mechanism, a pull-down menu showing a plurality of contexts 508 from which the user may select. Also shown, is that the user may select total (all contexts) 510 for which to conduct the contextual search.

In another embodiment, selections of contexts are not limited to user interface 500, and other approaches may also be employed. Thus, FIG. 8 provides another non-limiting, non-exhaustive example user interface for selecting one or more contexts. In still another embodiment, user interface 500 might include a link to user interface 800 of FIG. 8 to provide the user with a plurality of different input mechanisms.

Figure 6:
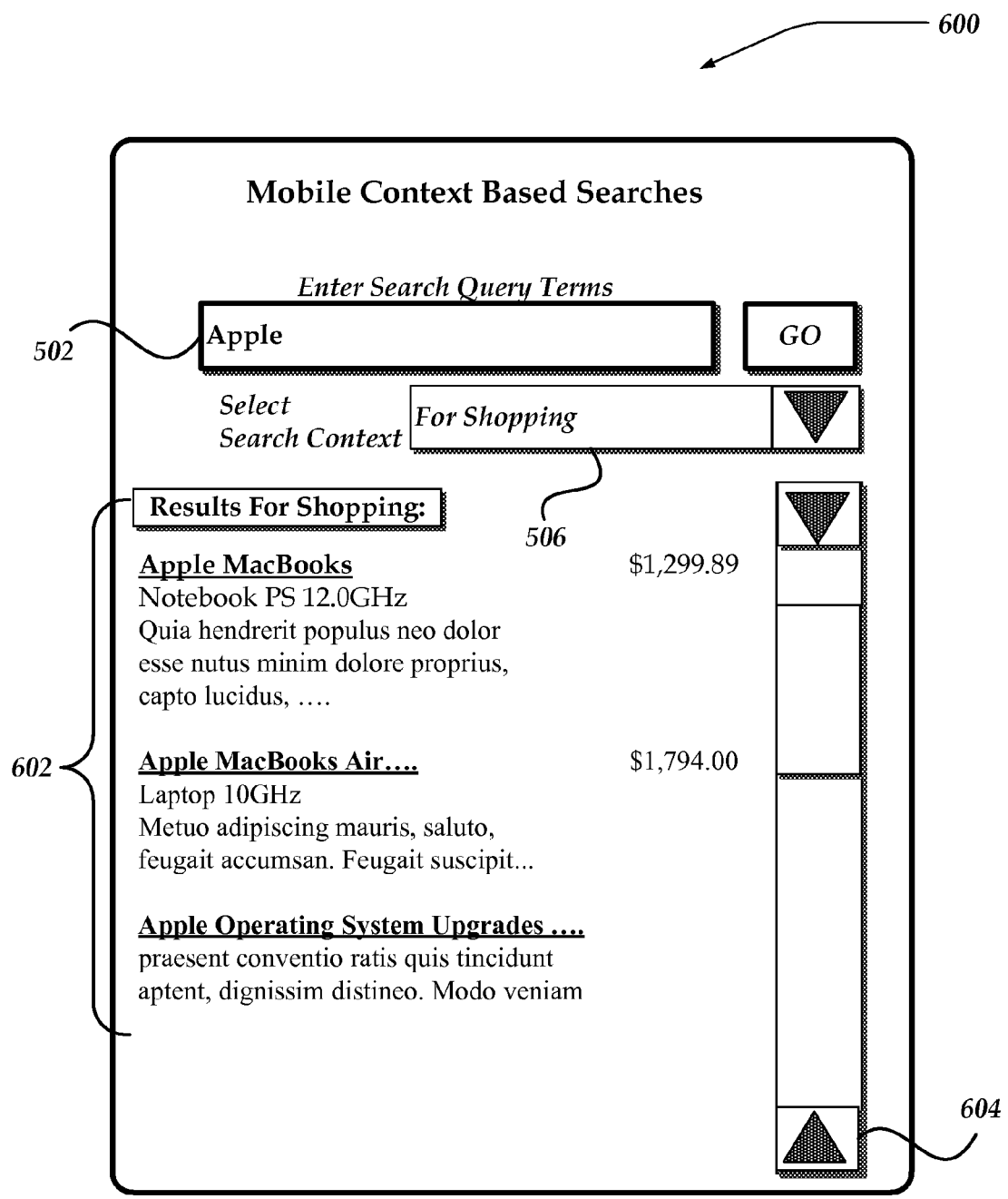

FIG. 6 illustrates one embodiment of a user interface 600 that may be displayed on a client device to provide search results. As shown, interface 600 includes query field 502, context selector 506, and results 602. In one embodiment, interface 600 may include a scroll mechanism 604 that may enable a user to scroll pages of results 602. However, the invention is not limited to scrolling, and other multi-page mechanisms may also be employed, including, but not limited to next page/previous page selection mechanisms, or the like. In one embodiment, the results 602 might be truncated to fit a single screen display. However, the invention is not limited to truncating results, and other formatting mechanisms may also be used, including reducing an amount of information displayed for each item in results 602, or the like. In another embodiment, interface 600 might be configured to not show context selector 506 and/or query field 502 on a same screen display as results 602, thereby further managing screen real estate.

Figure 7:
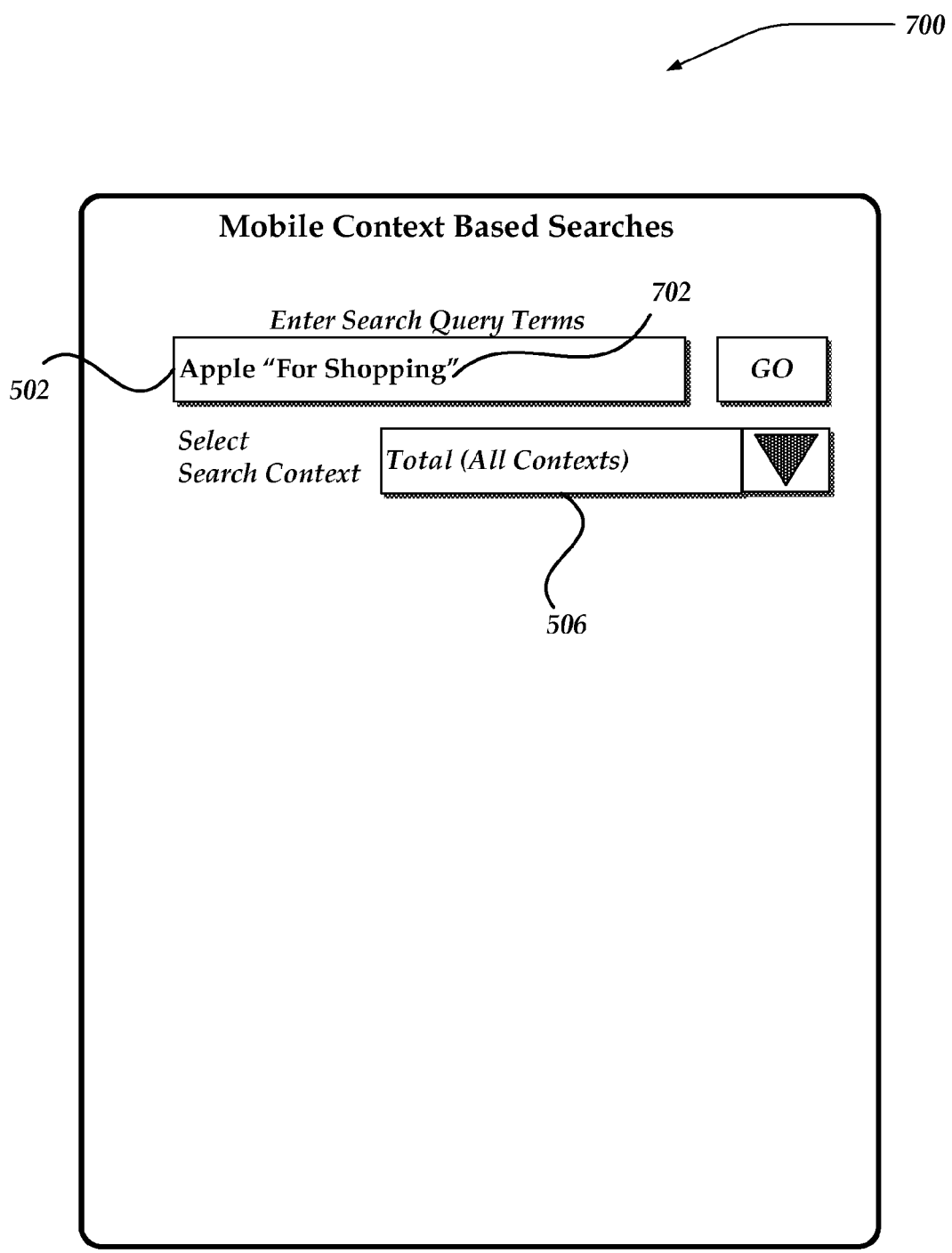

FIG. 7 illustrates one embodiment of a user interface 700 that may be displayed on a client device to provide search results. As shown, interface 700 includes query field 502 and context selector 506. Interface 700 illustrates that in one embodiment, the user may select to include context 702 within query field 502 along with the one or more query terms. In this manner, the user might be able to combine multiple contexts within the query field 502 for ease and efficiency of data entry.

FIG. 8 illustrates one embodiment of a user interface 800 that may be displayed on a client device to provide search results. As shown, interface 800 includes query field 502, multi-selector 802. Using multi-selector 802, a user may select to combine two or more pre-defined contexts to create a new context. However, the invention is not limited to using multi-selector 802. For example, in another embodiment, the user might be enabled to select and/or highlight a plurality of contexts within context selector 506 of FIG. 5. The user may then select to save the combination as a new context for subsequent searches, or employ the combination for a singular search, independent of saving the new combination. Thus, FIGS. 5 and 8 are not intended to be exhaustive examples, but merely representative of a plurality of different user input mechanisms for receiving a user's context selection.

Figure 9:
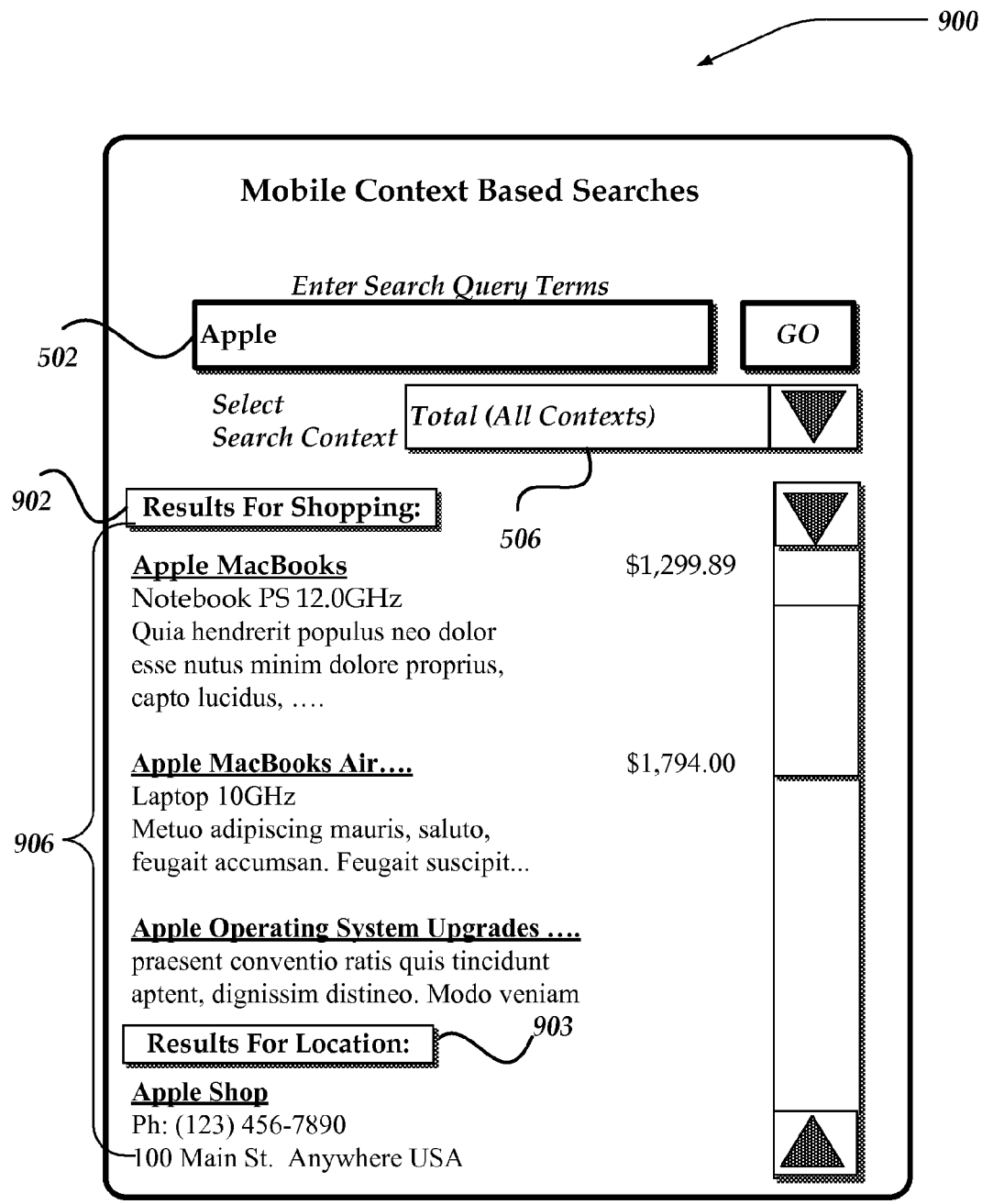

FIG. 9 illustrates one embodiment of a user interface 900 that may be displayed on a client device to provide search results. As shown, interface 900 includes query field 502, context selector 506, and ordered results 906. As shown, in one embodiment, where multiple contexts are employed in a search, the results may be ordered or organized based on a context (902-903). However, as noted above, the invention is not constrained to ordering the ordered results 906 based on contexts, and other mechanisms may be used, including, but not limited to those described above.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device comprising:
    a processor;
    a storage medium for tangibly storing thereon program logic for execution by the processor, the program logic comprising:
        receiving logic executed by the processor for receiving, from a user of a mobile device interacting with a mobile device user interface, a user-selected context comprising at least one user-selected context selected from a plurality of pre-defined contexts displayed on the mobile device for selection by the user via the user interface for performing a mobile search;
        receiving logic executed by the processor for receiving from the user of the mobile device a search query entered by the user using the mobile device user interface, the search query comprising one or more search terms;
        selecting logic executed by the processor for selecting, for the user, a number of subject category databases from a plurality of subject category databases accessible by the network device using the received search query and the received user-selected context;
        performing logic executed by the process for performing, within each selected subject category database, at least one search using the received search query and the received user-selected context;
        receiving logic executed by the processor for receiving search results from each performed search;
        aggregating logic executed by the processor for aggregating the received search results; and
        providing logic executed by the processor for providing the aggregated search results over the network for display at the mobile device in response to the search query and the user-selected context received from the user.

2. The network device of claim 1, wherein the plurality of pre-defined contexts comprises at least two of the following: for news, for fun, for shopping, for image, for eating, for education, or for consumables.

3. The network device of claim 1, wherein the defined categories comprises at least one of the following subject categories: finance, educational, blogs, location, answers, music, maps, images, or online dating, and each subject category database is associated with a different one of the subject categories.

4. The network device of claim 1, wherein the aggregating logic executed by the processor for aggregating the search results further comprises ranking logic executed by the processor for ranking ordering the search results based on a history of the user's previous searches.

5. The network device of claim 1, wherein the received at least one user-selected context is selected by the user by default to include all contexts of the plurality of pre-defined contexts.

6. A non-transitory computer readable storage medium tangibly storing computer program instructions capable of being executed by a computer processor, the computer program instructions comprising instructions for:
    receiving, from a user of a mobile device interacting with a mobile device user interface, a user-selected context comprising at least one user-selected context selected from a plurality of pre-defined contexts displayed on the mobile device for selection by the user via the user interface for performing a mobile search;
    receiving from the user of the mobile device a search query entered by the user using the mobile device user interface, the search query comprising one or more search terms;
    selecting, for the user, a number of subject category databases from a plurality of subject category databases accessible by the network device using the received search query and the received user-selected context;
    performing, within each selected subject category database, at least one search using the received search query and the received user-selected context;
    receiving search results from each performed search;
    aggregating the received search results; and
    providing the aggregated search results over the network for display at the mobile device in response to the search query and the user-selected context received from the user.

7. The non-transitory computer readable storage medium of claim 6, wherein the computer program instructions further comprising instructions for:
    receiving a selection of at least two of the plurality of pre-defined contexts; and
    combining the received selection to generate another context that is selectable from the plurality of pre-defined contexts.

8. The non-transitory computer readable storage medium of claim 6, wherein receiving the user-selected context and the search query further comprises enabling the user to input both the search query and the user-selected context within a single input field.

9. The non-transitory computer readable storage medium of claim 6, wherein the received at least one user-selected context is selected by the user by default to include all contexts of the plurality of pre-defined contexts.

10. The non-transitory computer readable storage medium of claim 6, wherein if the user selects more than one pre-defined contexts, then combining the results further comprises ordering the results based on each selected pre-defined context.

11. The non-transitory computer readable storage medium of claim 6, wherein the plurality of predefined contexts comprises at least two of the following: for news, for fun, for location, for shopping, for image, or for consumables.

12. A method comprising:
    receiving, by a network device from a user of a mobile device interacting with a mobile device user interface, a user-selected context comprising at least one user-selected context selected from a plurality of pre-defined contexts displayed on the mobile device for selection by the user via the user interface for performing a mobile search;

receiving, by the network device from the user of the mobile device, a search query entered by the user using the mobile user interface, the search query comprising one or more search terms;

selecting, by the network device for the user, a number of subject category databases from a plurality of subject category databases accessible by the network device using the received search query and the received user-selected context;

performing, by the network device and within each selected subject category database, at least one search using the received search query and the received user-selected context;

receiving, by the network device, search results from each performed search;

aggregating, by the network device, the received search results; and providing, by the network device, the aggregated search results over the network for display at the mobile device in response to the search query and the user-selected context received from the user.

13. The method of claim 12, wherein aggregating the search results further comprises rank ordering the search results based on a history of the user's previous searches.

14. The method of claim 12, wherein the search results are based on each of the user-selected context where the user-selected context includes a plurality of different contexts selected.

15. The method of claim 12, further comprising:
receiving a selection of at least two user-selected contexts from the plurality of pre-defined contexts; and
generating another pre-defined context by combining the at least two user-selected contexts.

16. A system comprising:
a plurality of subject category databases, wherein each subject category database is associated with a different defined category; and
a network device communicatively coupled to the plurality of subject category databases, the network device comprising a processor and a storage medium for tangibly storing thereon program logic for execution by the processor, the program logic comprising:
receiving logic executed by the processor for receiving, over a network from a user of a mobile device interacting with a mobile device user interface, a user-selected context comprising at least one user-selected context selected from a plurality of pre-defined contexts displayed on the user mobile device for selection by the user via the user interface for performing a mobile search;

receiving logic executed by the processor for receiving, over the network from the user's mobile device and the mobile device user interface, a search query entered by the user using the mobile device user interface, the search query comprising one or more search terms;

selecting logic executed by the processor for selecting, for the user, a number of subject category databases from the plurality of subject category databases accessible by the network device using the received search query and the received user-selected content;

performing logic executed by the processor for performing, within each selected subject category database, at least one search using the received search query and the received user-selected context;

receiving logic executed by the processor for receiving search results from each performed search;

organizing logic executed by the processor for organizing the received search results; and providing logic executed by the processor for providing the organized search results over the network for display at the mobile device in response to the search query and the user-selected context received from the user.

17. The system of claim 16, the logic executed by the processor for organizing the results further comprising:
organizing logic executed by the processor for organizing the results based on each of the pre-defined contexts, the user-selected context including all of the plurality of pre-defined contexts.

18. The system of claim 16, the organizing logic executed by the processor for organizing the results further comprising:
including logic executed by the processor for including the results based on a given context or information within a history of previous searches by the user of the mobile device.

19. The system of claim 16, the stored program logic further comprising:
receiving logic executed by the processor for receiving a request to generate a new context based on a combination of two or more pre-defined contexts; and
providing logic executed by the processor for providing the generated new context within the plurality of pre-defined contexts for subsequent selection to narrow a scope of a subsequent search.

* * * * *